(12) United States Patent
Cho (10) Patent No.: US 7,252,076 B2
(45) Date of Patent: Aug. 7, 2007

(54) INTERNAL COMBUSTION ENGINE WITH AIR-FUEL MIXTURE INJECTION

(75) Inventor: Masaki Cho, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/234,260

(22) Filed: Sep. 26, 2005

(65) Prior Publication Data

US 2006/0070606 A1 Apr. 6, 2006

(30) Foreign Application Priority Data

Sep. 27, 2004 (JP) .............................. 2004-279886

(51) Int. Cl.
*F02M 67/02* (2006.01)
(52) U.S. Cl. ..................................... 123/533; 123/531
(58) Field of Classification Search ................ 123/531, 123/533
See application file for complete search history.

(56) References Cited

U.S. PATENT DOCUMENTS 4,962,745 A * 10/1990 Ohno et al. .................. 123/533

6,899,089 B2 * 5/2005 Shiraishi et al. ............. 123/533
6,955,161 B2 * 10/2005 Suzuki et al. ................ 123/533

FOREIGN PATENT DOCUMENTS

JP 2938992 B2 6/1999

* cited by examiner

*Primary Examiner*—T. M. Argenbright
(74) *Attorney, Agent, or Firm*—Birch, Stewart, Kolasch & Birch, LLP (57) ABSTRACT

A structure for supplying assist air to an air-fuel mixture injection valve including a device for limiting the intake air taken by a compressor, whereby a drive force of the compressor required for compressing air is reduced, and fuel efficiency is achieved. The structure includes an inlet port of the compressor and a venturi member of an air-intake pipe brought into communication via an inlet channel. The air in the air-intake pipe is regulated by the venturi member through the inlet channel by driving the compressor and is taken to the compressor. Air compressed in the compressor is supplied through a high-pressure air channel to the air introduction portion of the fuel injection valve device, where fuel injected from the fuel injection valve and high-pressure air supplied to the air introduction portion are mixed to air-fuel mixture, and the air-fuel mixture is injected by the air-fuel mixture injection valve.

20 Claims, 8 Drawing Sheets

INTERNAL COMBUSTION ENGINE WITH AIR-FUEL MIXTURE INJECTION

CROSS-REFERENCE TO RELATED APPLICATION

The present application claims priority under 35 U.S.C. §119 to Japanese Patent Application No. 2004-279886 filed Sep. 27, 2004, the entire contents of which are hereby incorporated by reference.

BACKGROUND OF THE INVENTION

1. Field of the Invention

The present invention relates to an improved technology of an internal combustion engine with air-fuel mixture injection.

2. Description of Background Art

An air-fuel mixture injection type 2-cycle internal combustion engine in which compressed fuel from a fuel pump and pressurized air from an air-compressor to be supplied to a fuel injection valve are regulated in pressure by a differential pressure regulator, and excessive exhaust air which is run off by the differential pressure regulator when regulating the pressure is discharged into an air cleaner is known (for example, see Japanese Patent No. 2938992 (P.2-3, FIG. 1)). In addition, an air-fuel mixture injection type 2-cycle internal combustion engine in which an air-inlet port of the assist air compressor is connected to the clean side of the air cleaner is also known.

The work required to compress the air discharged as excessive air, which is a useless work in a sense, is performed by the compressor. In this sense, a drive force of the compressor corresponding to the compression of the excessive air is wasted, whereby fuel efficiency during driving of the internal combustion engine is lowered.

Therefore, it is desired to provide an improved technology in which improvement of fuel efficiency is achieved by regulating the amount of assist air adequately reducing the amount of excessive air supply, and eliminating the useless air compression work to improve driving efficiency of the air compressor, and in which air-intake noise of the air compressor by air-intake pulsation of the engine is reduced.

SUMMARY AND OBJECTS OF THE INVENTION

The present invention relates to provision of an improved structure of an air-fuel mixture injection in an internal combustion engine for solving the aforementioned problem.

According to a first aspect of the present invention, the internal combustion engine with air-fuel mixture injection includes an air-fuel mixture injection valve device for injecting mixture of fuel and air to an internal combustion engine, and a compressor driven by a power from a crankshaft for supplying compressed air to the injection valve device, wherein one end of the compressor on the side of the air-inlet port is connected to the air-intake pipe in the internal combustion engine.

According to a second aspect of the present invention one end on the air inlet side is connected to the air-intake pipe from the upstream of a throttle valve to a case of the air cleaner.

According to a third aspect of the present invention a venturi member to be formed in the case of the air cleaner on the downstream side of a filter element thereof, and one end of the inlet channel on the side of the air-inlet port is connected to the venturi member.

According to the first aspect of the present invention, air-fuel mixture injection valve device for injecting mixture of fuel and air to an internal combustion engine, and the compressor driven by a power from a crankshaft for supplying compressed air to the injection valve device, characterized in that one end of the compressor on the air inlet side is connected to the air-intake pipe in the internal combustion engine, loss of driving force at a high revolution of the compressor is reduced with a simple structure by using the inlet negative pressure of the air-intake pipe.

According to the second aspect of the present invention, since one end on the air inlet side is connected to an air-intake pipe from the upstream of a throttle valve to a case of the air cleaner, the length of piping can be reduced and the size of the entire apparatus can be reduced.

According to a first aspect of the present invention, since the air cleaner includes a venturi member formed in the case on the downstream side of a filter element thereof, and one end of the inlet channel on the side of the air-inlet port is connected to the venturi member, flow of the excessive air into the compressor is restrained by increasing the difference of inlet negative pressure by the pressure reducing effect of the venturi member to further reduce the loss of driving force, and the noise of the air-intake pulsation generated from the air-inlet port of the inlet channel can be reduced by the air cleaner case.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 2(a) and 2(b) are cross sectional views showing the principal structure of a first embodiment of the present invention, in which

DETAILED DESCRIPTION OF THE PREFERRED EMBODIMENTS

Figure 1:
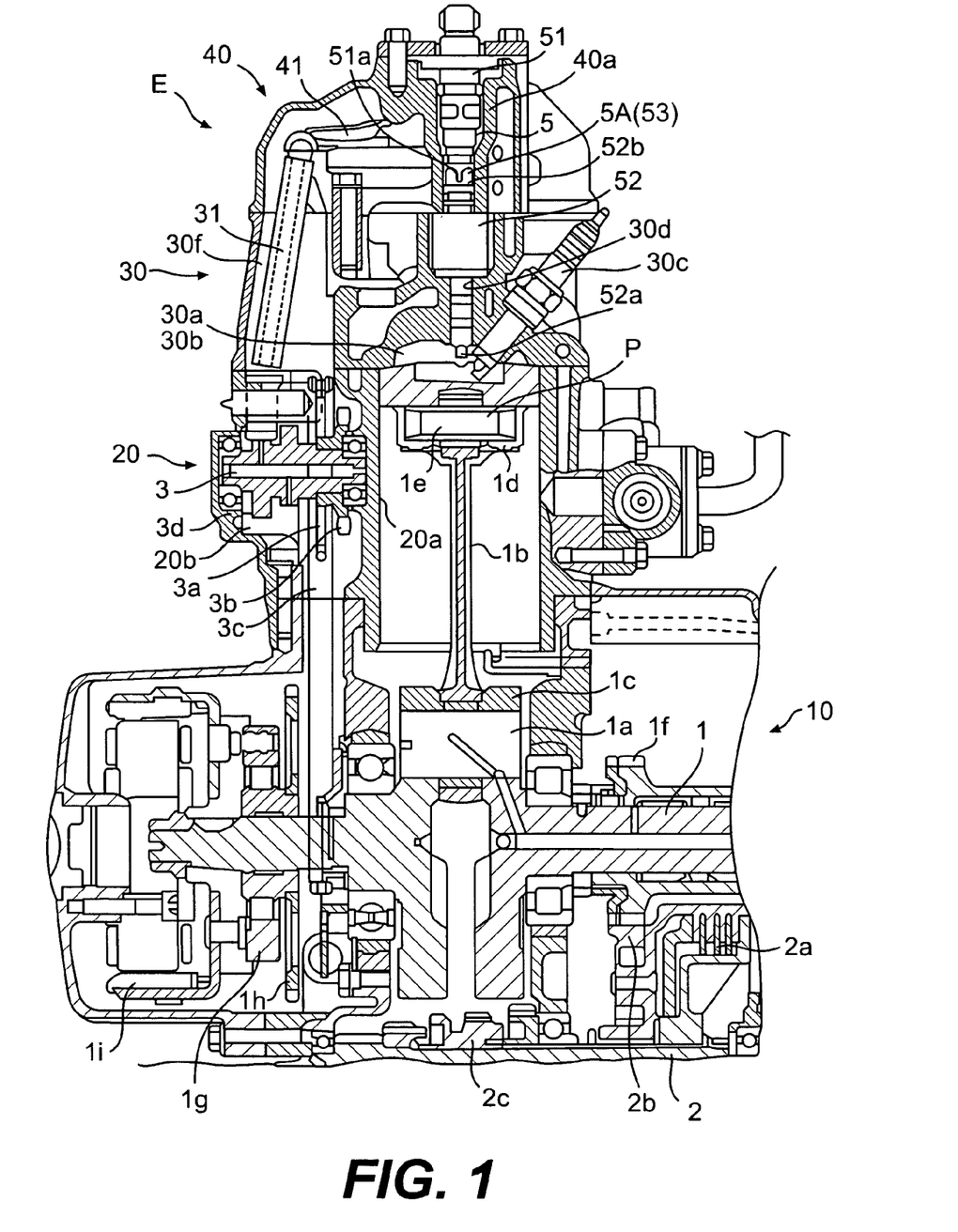
FIG. 1 is a vertical cross-sectional view showing a principal structure of an internal combustion engine of the present invention.

An internal combustion engine E of the present invention is a single-cylinder four-cycle internal combustion engine to be mounted laterally on a vehicle body of the motorcycle with a cylinder head side directed forward, the crankcase side directed rearward, and the air-inlet port side upward of the vehicle on the motorcycle. FIG. 1 shows a principal structure of the internal combustion engine E. Therefore, an air-intake pipe 6 (see FIG. 2(a)) connected to the air-inlet port of the internal combustion engine E mounted on the vehicle body extends obliquely upward toward the front of the vehicle body, although it is not shown in the drawing.

The internal combustion engine E includes a crankcase 10, a cylinder block 20 to be assembled to the crankcase 10, a cylinder head 30 to be assembled to the cylinder block 20, and a cylinder head cover 40 to be mounted on the cylinder head 30. A crankshaft 1 is rotatably journaled in the crankcase 10, a connecting rod 1b is rotatably supported by a single crankpin 1a of the crankshaft 1 via a large end portion 1c thereof, and a piston P is pivotably supported by a small end portion 1d of the connecting rod 1b via a piston pin 1e. The piston P reciprocates in a cylinder bore 20a provided in the cylinder block 20.

A drive gear 1f is attached to the crankshaft 1, and the drive gear 1f meshes with a driven gear 2b which is connected to a clutch 2a rotatably and loosely fitted to a main shaft 2 of a transmission, which is not clearly shown in the drawing, whereby rotation of the drive gear 1f, that is, rotation of the crankshaft 1 is transmitted to the main shaft 2 via connection of the clutch 2a.

A plurality of transmission gears 2c are mounted on the main shaft 2, and a counter shaft is rotated by a predetermined transmission ratio by selective meshing between the transmission gears 2c with a plurality of transmission gears mounted to the countershaft, not shown, and a drive wheel for traveling of the vehicle is driven and rotated via a transmission chain or the like from a drive sprocket mounted to the counter shaft. A sprocket 1g for transmitting power to a push-rod operating camshaft 3 via a chain 3c for opening and closing an air-inlet/discharge valve, and a gear 1h and a generator 1i or the like interlocked with a starter motor for starting the engine, not shown, are mounted to the crankshaft 1.

The cylinder block 20 is provided with a cylinder bore 20a for sliding the piston P substantially at the center as described above, and the above-mentioned push-rod operating camshaft 3 is rotatably journaled in a through-hole 20b formed adjacently to the cylinder bore 20a of the block 20. The camshaft 3 includes a sprocket 3a of a large diameter and a sprocket 3b of a small diameter mounted in parallel to each other, and the chain 3c is wound around the sprocket 3a of a large diameter and the sprocket 1g mounted to the crankshaft 1, whereby the camshaft 3 is driven and rotated via the chain 3c.

A cam follower below a pushrod 31 for operating a rocker arm 41 comes into abutment with a cam 3d of the camshaft 3, and the rocker arm 41 is driven for opening and closing the inlet/discharge valve, described later, by a pushing operation of the push rod 31 in association with the rotation of the camshaft 3.

Figure 2A:
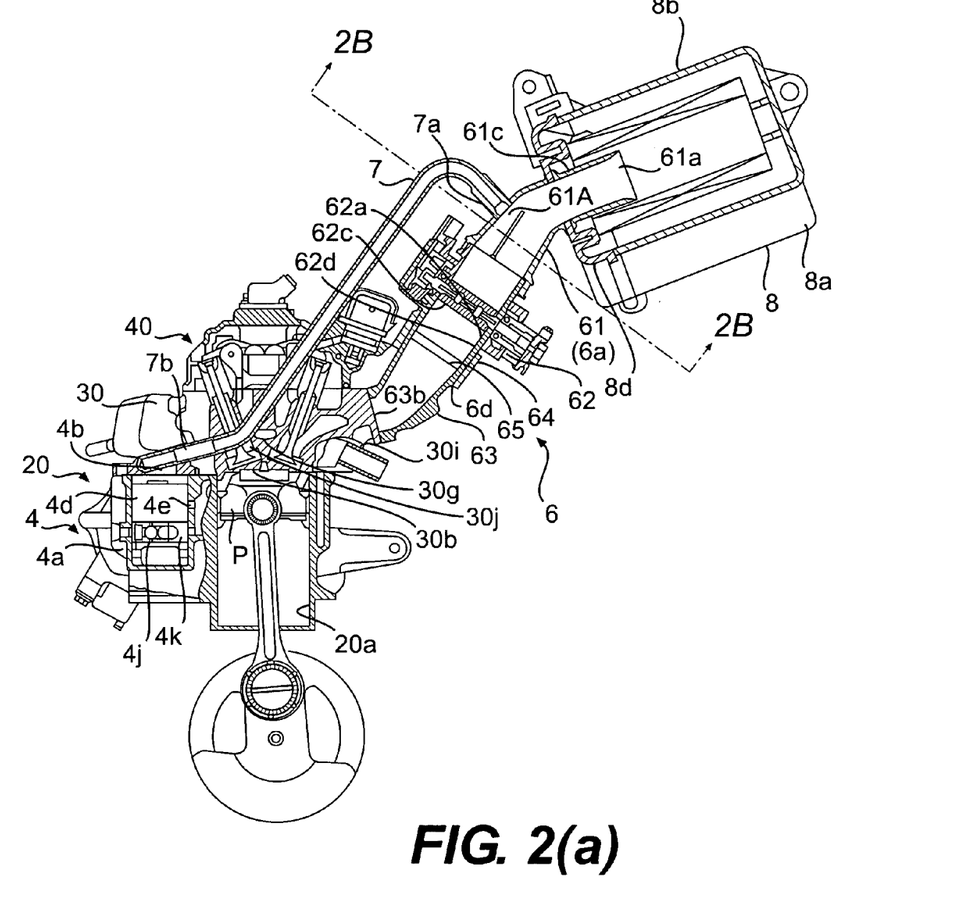
FIG. 2(a) is a general view of the principal structure.
Figure 4:
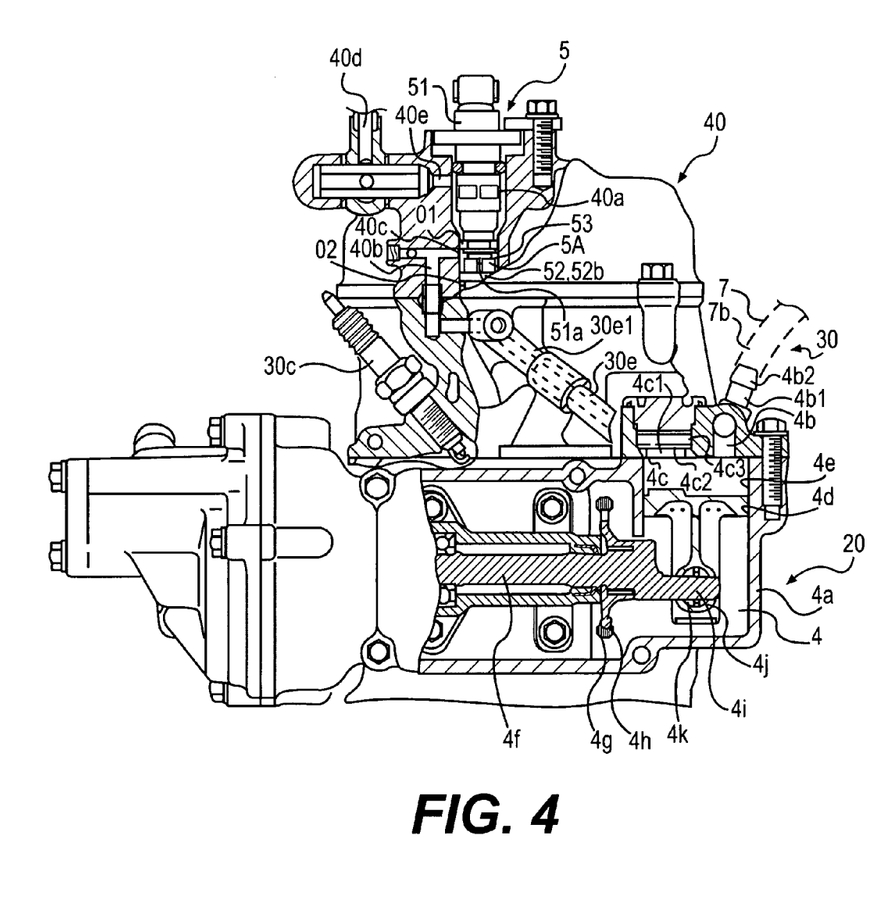
FIG. 4 is an enlarged view of an internal combustion engine structure showing a high-pressure air supply structure of the present invention.

The sprocket 3b of a small diameter of the camshaft 3 is a sprocket for transmitting a drive force to a sprocket 4g mounted to a drive shaft 4f of an assist air compressor 4 (see FIG. 4), described later, via a chain 4h. The air compressor 4 is driven by power transmission via the chain 4h. The assist air compressor 4 is provided on an injection valve device 5, described later, for supplying a high-pressure air compressed for injecting air-fuel mixture and, as shown in FIGS. 2(a) and 4, the compressor 4 is integrated with the cylinder block 20 with a case portion 4a thereof as a single unit. The structure of the assist air compressor 4 and supply of the high pressure air by the compressor 4 will be described later.

Returning now to FIG. 1, the cylinder head 30 is provided with a recess 30a at an adjacent joint portion with respect to the cylinder block 20, and the recess 30a defines a combustion chamber 30b in cooperation with the upper portion of the cylinder bore 20a. An ignition plug 30c is mounted to the combustion chamber 30b so as to be exposed therein, and an air-fuel mixture injection valve 52 of the fuel injection device 5 is also mounted thereto with an injection port 52a thereof exposed therein.

Mounting of the air-fuel mixture injection valve 52 in this arrangement is achieved with respect to a vertical through-hole 30d at substantially center of the cylinder head 30 positioned concentrically with a hole 40a for mounting a fuel injection valve 51 which penetrates substantially through the center of the cylinder head cover 40, described later, in the vertical direction. Mounting of the air-fuel mixture injection valve 52 realizes a fitting structure of the injection valve device 5 including the air-fuel mixture injection valve 52 and the fuel injection valve 51 connected in series to vertical through-holes 40a, 30d penetrating through the cylinder head 30 and the cylinder head cover 40 as a result.

Figure 5:
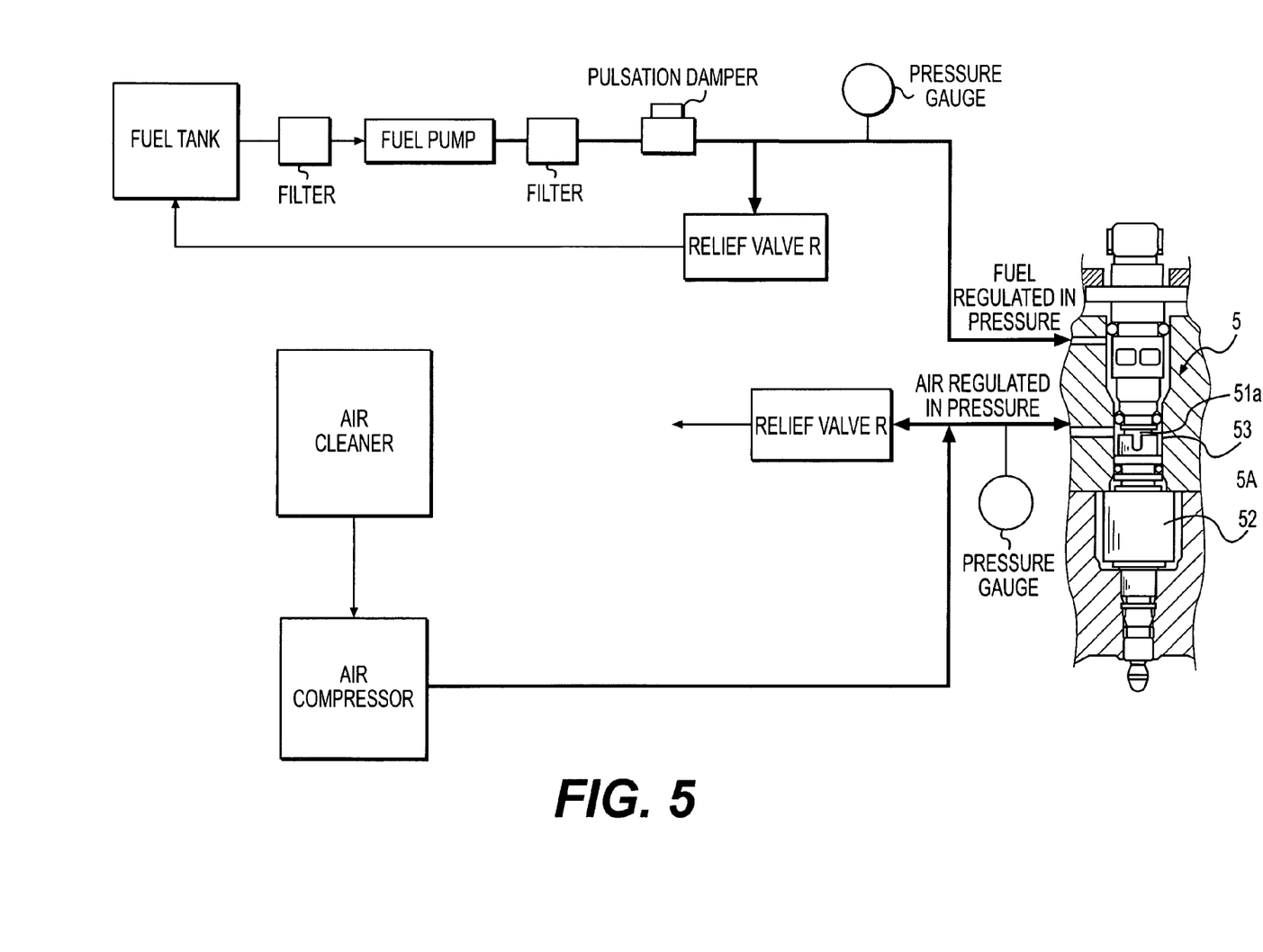
FIG. 5 is a schematic view showing a fuel supply path and a high-pressure air supply path to the fuel injection device.

As shown in FIG. 4, the cylinder head 30 is provided with an inlet port 4b of the assist air compressor 4 for taking air, a discharge port 4c for supplying compressed air from the compressor 4, a partial structure 30e1 of a high-pressure air supply channel 30e in the head 30 in communication with the discharge port 4c for supplying compressed high-pressure air to the fuel injection device 5, a relief valve R and the like for regulating supplied high pressure air and discharging excessive air (see FIG. 5), and also a storage 30f for a push rod 31 pushing the above-described rocker arm 41 (see FIG. 1), intake/discharge valves 30g, 30h, and intake/discharge passages 30i, 30j, and so on (see FIG. 2(a)). The structure of the injection valve device 5 and the structure of an inlet channel 7 (see FIG. 2(a)) connected to the air-intake pipe 6 of the engine E having a characteristic structure will be described later in detail.

As shown in FIGS. 1 and 4, the cylinder head cover 40 is provided with the center through-hole 40a for fitting the fuel injection valve 51 of the above-described injection valve device 5 substantially at the center thereof, and also with a fuel supply channel 40d and a supply port 40e to the fuel injection valve 51. Part 40b of the supply channel which is in communication with the partial structure 30e1 of the high-pressure air supply channel 30e in the cylinder head 30, a supply port 40c of the high-pressure air to a connecting portion 53 between the fuel injection device 51 and the air-fuel mixture injection valve 52, and an air introduction portion 5A are also provided.

The head cover 40 is also provided with the rocker arm 41, which is pushed by the aforementioned push rod 31 and pushes down the upper end of a valve stem of the intake/discharge valves 30g, 30h, and the like are disposed, and the head cover 40 covers members disposed in the cover 40 from the outside to secure safety and protection of these members.

The structure of the internal combustion engine E is as described above.

As shown in FIGS. 1 and 4, and as described above, the injection valve device 5 is constituted of two injection valves disposed continuously in series. In other words, it includes a fuel injection valve 51 for injecting liquid fuel and an air-fuel mixture injection valve 52 having a head portion 52b connected to the injection port 51a of the injection valve 51. The connecting portion 53 between the both injection valves 51, 52 is provided with the high-pressure air introduction portion 5A. These two injection valves 51, 52 are connected to each other in series, and are disposed across the cylinder head 30 and the cylinder head cover 40. This arrangement is achieved by being fitted into the holes 30d, 40a penetrated through substantially the center of the aforementioned cylinder head 30 and the cylinder head cover 40.

While the fuel injection valve 51 and the air-fuel mixture injection valve 52 are fitted to the through holes 30d, 40a located at substantially the center of the cylinder head 30 and the cylinder head cover 40 respectively, in the above described connection relation and layout, the fitting is achieved via a plurality of O-rings as sealing members, whereby the high-pressure air introduction portion 5A at the connecting portion 53 are defined as a sealed space between the O-rings O1 and O2 when the injection valves 51, 52 are fitted, and is located on the side of the cylinder head cover 40.

The air introduction portion 5A is connected to the high-pressure air discharge port 4c of the assist air compressor 4 via the high-pressure air supply channels 30e, 40b in the cylinder head cover 40 and the cylinder head 30, and high pressure air from the air compressor 4 is introduced into the air introduction portion 5A at the connecting portion 53 between the fuel injection valve 51 and the air-fuel mixture injection valve 52 via the high-pressure air supply channels 30e, 40b.

The high pressure air introduced into the air introduction portion 5A at the connecting portion 53 between the fuel injection valve 51 and the air-fuel mixture injection valve 52 is mixed with fuel injected by the fuel injection valve 51 in the connecting portion between the both valves into high-pressure air-fuel mixture, and the air-fuel mixture is injected into the combustion chamber 30b from the injection port 52a exposed in the combustion chamber 30b of the air-fuel mixture injection valve 52 (see FIG. 1).

Figure 2B:
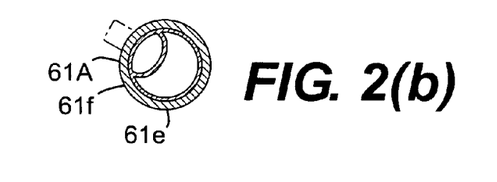
FIG. 2(b) is a cross-sectional view taken along a line II-II in FIG. 2(a)

As described above, the air-intake pipe 6 having a characteristic structure is connected to the air-intake passage 30i (see FIG. 2(a)) in the cylinder head 30. The air-intake pipe 6 shown in FIGS. 2 and 3 has a structure having three cylindrical connecting pipes 61, 62, and 63 connected to each other, and although not shown in the drawing, is extended obliquely upward toward the front of the vehicle body of the motorcycle. An air cleaner 8 is mounted to a pipe end 6a located at upward position thereof, that is the first connecting pipe 61 located at the upper most position out of the three connecting pipes. The air cleaner 8 has a structure in which a filter element 8b for removing foreign particles or dust in air is provided in a substantially cylindrical cleaner case 8a.

Figure 3:
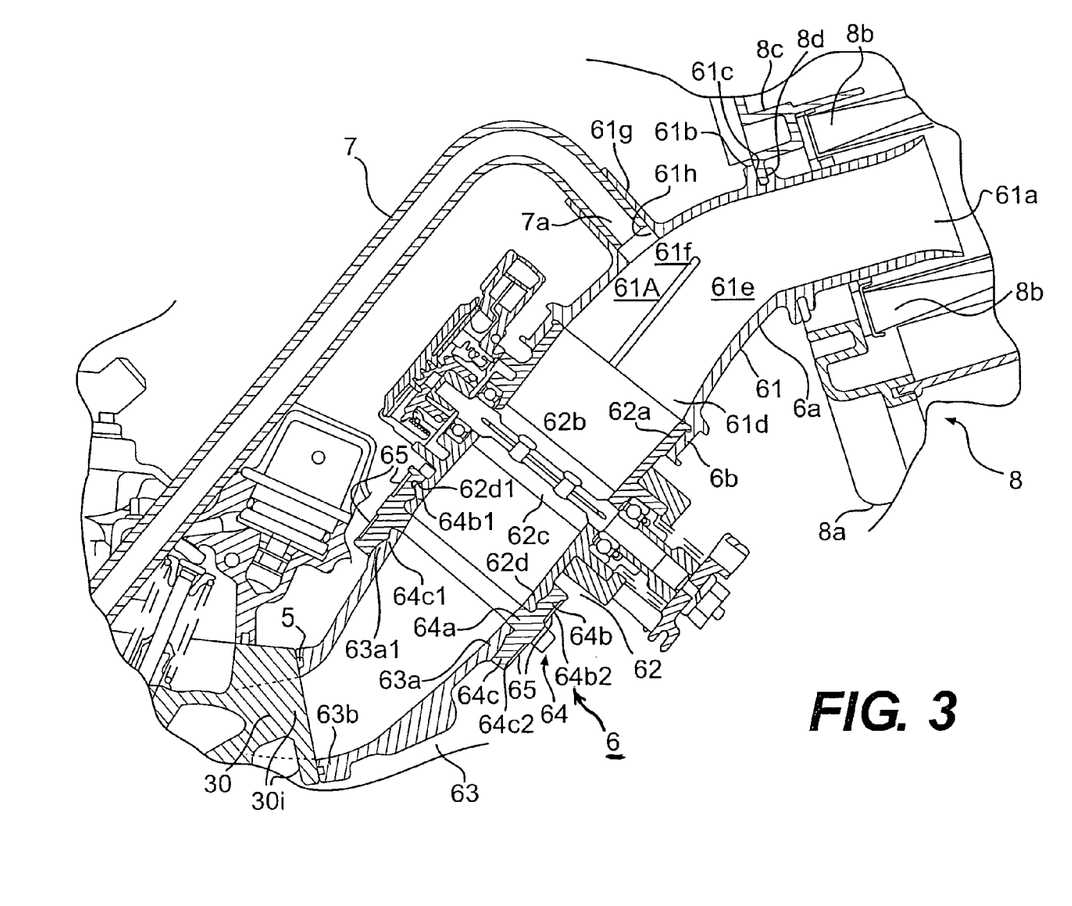
FIG. 3 is an enlarged cross-sectional view showing the principal structure of the present invention.

Mounting of the air cleaner 8 to the pipe end 6a of the air-intake pipe 6 to, that is, to the aforementioned uppermost first connecting pipe 61 is achieved by inserting the upstream end 61a of the first connecting pipe 61 into the air cleaner 8 by a predetermined length, and tightly fitting an annular flange end 8d of a closed lid member 8c, which extends inwardly and opened on the inner periphery at one end of the cleaner case 8a into an annular recessed groove 61c of an annular protruding portion 61b on the outer periphery of the connecting pipe 61.

The first connecting pipe 61 has a slightly bent outline, and a portion to be inserted into the cleaner 8 of the air cleaner 8 mounted portion at the upstream end 61a thereof is slightly thinner. The opening of the upstream end 61a thereof is increased in diameter like a trumpet and, from the extending portion adjacent to the cleaner 8 mounted portion, it is slightly curved and increased in inner diameter toward the downstream side away from the cleaner 8. A downstream end 61d is connected to an upstream end 62a of the second connecting pipe 62 as the throttle body via joint portions 6b, which are configured into an annular concavo-convex fitting structure.

The downstream side of the first connecting pipe 61 which is adjacent to the joint portion 6b is provided with a venturi member 61a inside thereof. The venturi member 61A is formed into substantially oval shape as shown in FIG. 2(b) in lateral cross section, and has large and small divided passages 61e, 61f substantially in the section of a predetermined length adjacent to the joint portion 6b in the connecting pipe 61. Connected to the upstream side of the venturi member 61A is the air-inlet channel 7 which comes into communication with the inlet port 4b of the air compressor 4. Therefore, the connecting pipe 61 is provided with a connection opening 61h defined by a cylindrical projection 61g, and the inlet channel 7 communicates with the venturi member 61A and the inlet port 4b of the air compressor 4 by the outer periphery of an end 7a of the inlet channel 7 fitted into the cylindrical projection 61g.

The upstream end 62a of the second connecting pipe 62 as the throttle body is connected to the first connecting pipe 61 at the downstream end 61d via the joint portion 6b formed of annular concavo-convex structure. Since the second connecting pipe 62 is a substantially straight pipe of a predetermined length, and is provided with a throttle valve 62c at a longitudinal center 62b thereof which opens and closes for varying the opening area of the inner passage of the pipe, that is, for adjusting the amount of inlet air flowing in the pipe by rotation by electronic control.

Although the second connecting pipe 62, which is a pipe of a predetermined length, is a cylindrical pipe having substantially predetermined inner diameter, it is decreased slightly in diameter from both ends to the longitudinal center portion 62b of the inner diameter, that is, a position where the throttle valve 62c is disposed, into a tapered shape. The pipe 62 of the constant length, which is substantially the throttle body, is connected to the downstream end 61d of the first connecting pipe 61 as described above at the upstream end 62a, while the downstream end 62d of the connecting pipe 62 is connected to an upstream end 63a of the third connecting pipe 63 and a downstream end 63b of the third connecting pipe 63 is brought into communication with the air-intake passage 30i inside the cylinder head 30, whereby the second connecting pipe 62 as the throttle body is brought into communication with the inner air-intake passage 30i of the cylinder head 30.

The third connecting pipe 63 which brings the second connecting pipe 62 as the throttle body into communication with the air-intake passage 30i inside the cylinder head 30 is a pipe which is gradually decreased in inner and outer diameter into a tapered shape at the downstream portion by a predetermined length. The end 63a on the upstream side is connected to the second connecting pipe 62 as the throttle body as described above, and the connection is achieved by an annular connecting member 64. The connecting member 64 includes a thick annular center portion 64a in lateral cross-section and flange portions 64b, 64c extending annularly from the center portion 64a toward both outer sides and having projections 64b1, 64c1 on the annular inner periphery thereof.

The third connecting pipe 63 as the tapered pipe is firmly connected at the upstream end 63a to the second connecting pipe 62 as the throttle body by engaging annular inner peripheral projection 64b1 on one flange portion 64b with the annular outer peripheral recess 62d1 of the connecting portion 62d of the second connecting pipe 62 on the downstream side, engaging the annular inner peripheral projection 64c1 of the other flange portion 64c with the annular outer peripheral recess 63a1 of the upstream end 63a of the taper-shaped third connecting pipe 63, and fitting and tightening a band shaped body 65 into the recesses 64b2, 64c2 on the outer periphery of the flange portions 64b, 64c respectively.

The downstream end 63b of the third connecting pipe 63 as the tapered pipe is abutted against and joined to the opening of the air-intake passage 30i of the cylinder head 30 in tight contact manner via a seal member S concentrically with the passage.

Therefore, intake air with the foreign particles and dust removed by the air cleaner 8 is supplied from the air cleaner 8 through the first connecting pipe 61, the portion of the second connecting pipe 62 as the throttle body where the opening of the passage is adjusted by the throttle valve 62, and via the third connecting pipe 63 to the air-intake passage 30i in the cylinder head 30 and then to the combustion chamber 30b during operation of the internal combustion engine E.

As described above, the cylinder block 20 is provided with the assist air compressor 4 having a case body 4a thereof is integrated thereto. The air compressor 4 is a so-called reciprocating compressor 4 having a piston 4d which makes reciprocated sliding movement, and as shown in FIG. 4, is provided with a small cylinder bore 4e having an axial line extending in parallel with the cylinder bore 20a (see FIG. 2(a)) of the internal combustion engine E provided in the above-described case body 4a, a small piston 4d which makes reciprocated sliding movement in the cylinder bore 4e, the above-described inlet port 4b for taking air, a discharge port 4c for discharging and supplying compressed air, and so on.

The compressor 4 is provided with the drive shaft 4f for driving the same, and the sprocket 4g is mounted to the drive shaft 4f, and the chain 4h is wound between the sprocket 4g and the sprocket 3b (see FIG. 1) of the pushing cam shaft 3 of the push rod 31 for the rocker arm 41, thereby being driven via the chain 4h. The drive shaft 4f is provided with an eccentric drive portion 4i having an engaging portion with respect to the piston 4d at the end of the shaft thereof for driving the piston 4d of the compressor 4.

The engaging portion of the eccentric drive portion 4i of the drive shaft 4f with respect to the lower portion of the compressor piston 4d includes a small power transmission piston 4j engaging with the eccentric drive portion 4i and a piston sliding hole 4k formed below the compressor piston 4d to which the power transmission piston 4j is fitted and reciprocally slid. The compressor piston 4d reciprocates in the vertical direction in the cylinder bore 4e by the eccentric movement by the rotation of the eccentric drive portion 4i. The downward stroke of the compressor piston 4d is a stroke to intake air from the air-inlet port 4b, and the upward stroke is a stroke to compress and discharge the taken air. Intake of air and discharge and supply of compressed air will be described later.

The reciprocating movement of the compressor piston 4d by the eccentric rotation of the eccentric drive portion 4i is achieved by the reciprocating sliding structure of the transmission piston 4j which follows the eccentric rotation of the eccentric drive portion 4i in the sliding hole 4k.

The inlet port 4b of the compressor 4 is located above the cylinder block 20, and substantially is provided on the cylinder head 30. The inlet port 4b includes a connecting portion 4b1 as the connecting structure, and the connecting portion 4b1 is a connecting portion to the inlet channel 7 for taking air. The other end 7b on the air-discharging side of the inlet channel 7 is inserted to and connected to the outer periphery of a head portion 4b2 of a tapered shape having a drawn down shoulder, whereby the inlet port 4b of the compressor 4 and the air-intake pipe 6 of the aforementioned internal combustion engine E are connected to each other so as to allow air to flow through.

Figure 6:
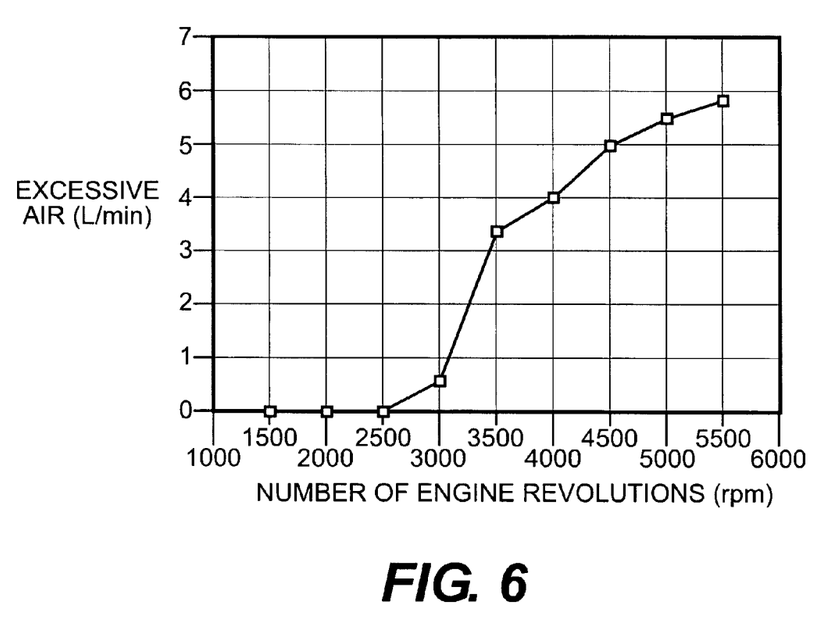
FIG. 6 is a drawing showing an amount of excessive air out of the amount of air supply in an air-fuel mixture injection device in the related art.

FIG. 6 shows an example of a state of using air compressed by an air compressor in the related art. According to this drawing, it is understood that a relatively large amount of air is required when the number of revolution of the engine is in the low revolution range while only a relatively small amount of air is required in the high revolution range where the number of engine revolution is large.

In other words, according to FIG. 6, it is understood that the structure in which compressed air from the air compressor is supplied to the injection valve device provided with the fuel injection valve and the air-fuel mixture injection valve having the compressed air introduction portion has such a tendency that the amount of compressed air as the required amount of supply is relatively large in the low revolution range of the internal combustion engine, and is relatively small in the high revolution range, and that a large amount of excessive air is compressed and wasted in the high revolution range, whereby unproductive energy is consumed in driving of the compressor, and lowering of fuel efficiency in driving the engine is resulted correspondingly.

In a second embodiment of the present invention, the aforementioned technical view is taken into account, and the inlet channel 7 has the characteristic structure for connecting the inlet port 4b of the compressor 4 and the air-intake pipe 6 of the internal combustion engine E for communicating therebetween, which is an advantageous technical selection for improving the problem.

As shown in FIGS. 2 and 3, connection of the inlet channel 7 to the air-intake pipe 6 is achieved on the upstream side of the venturi member 61A in the first connecting pipe 61 of the air-intake pipe 6, and this connection, which has been described above, is achieved by utilizing the cylindrical projection 61g on the outer periphery of the first connecting pipe 61 which corresponds to the upstream of the venturi member 61A, and by insertion of the end 7a of the inlet channel 7 on the side of the air-inlet port into the cylindrical projection 61g.

Therefore, as will be understood from the connecting structure by the inlet channel 7, the amount of air flowing into the inlet channel 7 by the venturi member 61A of the air-intake pipe 6, that is, the amount of supply of air to the compressor 4 is adjusted. The adjustment, which will be described later, is a structure which causes generation of negative pressure at the end 7a of the inlet channel 7 on the inlet port side by the air flow squeezing action of the venturi member 61A of the air-intake pipe 6, thereby limiting the amount of air flowing into the inlet channel 7 by the action of the negative pressure.

As shown in FIG. 4, the compressed air discharge port 4c of the compressor 4 is positioned above the cylinder block 20 adjacent to the inlet port 4b, and is provided substantially on the cylinder head 30 like the inlet port 4b. The opening 4c1 of the discharge port 4c is provided with a check valve 4c2 urged by a spring for preventing backflow of discharged high-pressure air, and the discharge port 4c is in communication with the aforementioned high-pressure air supply channel 30e formed in the cylinder head 30. The air supply channel 30e is provided with a relief valve R (see FIG. 5) not shown, whereby discharge of excessive air is effected by the pressure regulating action of the relief valve R, and the high-pressure air regulated in pressure is supplied through the supply channel 30e to the air introduction portion 5A of the connecting portion 53 of the aforementioned injection valve device 5.

The structure of the present embodiment is generally as described above, and the cam shaft 3 is rotated in conjunction with the rotation of the crankshaft 1 by driving of the internal combustion engine E via the chain 3c. The rotation of the camshaft 3 causes movement of the rocker arm 41 (see FIG. 1) via the pushing movement of the cam follower of the push rod 31 by the cam 3d on the shaft 3, and opening-closing movement of the intake/discharge valve 30g, 30h (see FIG. 2) by the operation of the rocker arm 41, and also driving of the compressor drive shaft 4f by the chain 4h wound between the sprocket 3b on the shaft 3 and the sprocket 4g on the drive shaft 4f of the air compressor 4, whereby the compressor piston 4d is reciprocated by the eccentric rotation of the eccentric drive portion 4i at the shaft end by driving of the compressor drive shaft 4f, whereby the air compressor 4 is operated (see FIG. 4).

Air is taken from the inlet port 4b above the cylinder block 20 by the operation of the compressor 4, that is, by the downward movement of the compressor piston 4d in the cylinder bore 4e. Intake of air from the inlet port 4b of the air compressor 4 is achieved through the inlet channel 7 from the upper portion of the venturi member 61A on the slightly downstream side of the first connecting pipe 61 of the air-intake pipe 6 in which the air-intake operation has already started (see FIGS. 2(a) and 3)

When the compressor piston 4d reaches the lower dead-center and the intake stroke is terminated, the inlet port 4b is closed, and then the piston 4d starts upward movement to initiate the compression stroke. In the course of upward movement of the piston 4d, the air pressure in the cylinder bore 4e reaches a predetermined pressure, the check valve 4c2 which closes the opening 4c1 of the discharge port 4c opens against the pressing force of a spring 4c3, and the high-pressure compressed air at the predetermined pressure flows from the discharge port 4c to the high-pressure air supply channels 30e, 40b in the cylinder head 30 and the cylinder head cover 40 (see FIG. 4).

The high pressure air flowed into the high pressure air supply channels 30e, 40b is regulated by the pressure regulation action of, the relief valves R (see FIG. 5) provided at a predetermined positions in the supply channel 30e, 40b, and supplied to the air introduction portion 5A of the connecting portion 53 between the fuel injection valve 51 and the air-fuel mixture injection valve 52 of the injection valve device 5. The relief valves R are adapted to be opened when the pressure in the high pressure air supply channels 30e, 40b is increased to a pressure exceeding the predetermined pressure to discharge excessive high-pressure air, whereby safety of the high-pressure air supply system and adequate injection of the air-fuel mixture injection valve 52 are secured.

The speed of airflow flowing in the air-intake pipe 6 increases as the number of revolution of the engine E increases. In particular, in the venturi member 61A, the speed of flow further increases by the squeezing action thereof, whereby negative pressure is generated in the inlet channel 7 provided with the end 7a on the side of the air-inlet port as a connecting opening, and generation of the negative pressure limits the amount of air flowing into the inlet channel 7 from the air-intake pipe 6.

On the other hand, since the compressor 4 is driven in conjunction with the crankshaft 1 as described above, the driving force is increased with increase in the number of engine revolution. However, increase in amount of intake air is restrained and the amount of compressed air to be discharged is limited. An adequate value of the amount of high-pressure air to be supplied is a value to be determined in design, and setting of the flow path of the venturi member 61A for securing the adequate amount of air is determined in design.

Therefore, irrespective of increase in the number of engine revolution, the amount of high-pressure air supplied from the discharge port 4c of the compressor 4 through the high-pressure air supply channels 30e, 40b to the injection valve device 5 is adequately limited. The high-pressure air is regulated in pressure via the high-pressure supply channels 30e, 40b having the relief valves R as the pressure regulating means and is supplied to the air introduction portion 5A of the connecting portion 53 between the fuel injection valve 51 and the air-fuel mixture injection valve 52 of the injection valve device 5. Since the amount of high-pressure air is adequately limited, the amount of air discharged by the relief valves R is limited.

In the first embodiment of the present invention, with the above-described structure, the following effects and advantages are achieved.

In this first embodiment, the amount of intake air to the inlet port 4b of the compressor 4 is controlled and limited by the use of intake negative pressure of the venturi member 61A in the air-intake pipe 6, useless compression of the excessive air by the compressor 4 is eliminated, and hence loss of drive force of the compressor 4 can be reduced and reduction of fuel consumption in operation of the engine E is achieved. Since the amount of intake air is controlled and limited by utilizing intake negative pressure in the air-intake pipe 6, a device which can achieve desired effects is obtained by a simple modification of the structure at a low cost.

Since the relief valves R are provided on the high-pressure air supply channels 30e, 40b for supplying the high-pressure air discharged from the discharge port 4c of the compressor 4 to the injection valve device 5, safety in the high pressure air supply system is secured and hence adjustment of the air-fuel mixture in the injection valve device 5 is ensured. Furthermore, since the amount of air supplied to the supply channels 30e, 40b is limited, the amount of air discharged as excessive air is small.

Since the connecting portion of the inlet channel 7, which communicates with the inlet port 4b of the compressor 4 and the air-intake pipe 6, with respect to the air-intake pipe 6 is provided on the first connecting pipe 61 between the upstream of the throttle valve 62c to the air cleaner case 8a, the length of the inlet channel 7 can be relatively reduced, and hence the entire device can be downsized.

Figure 7:
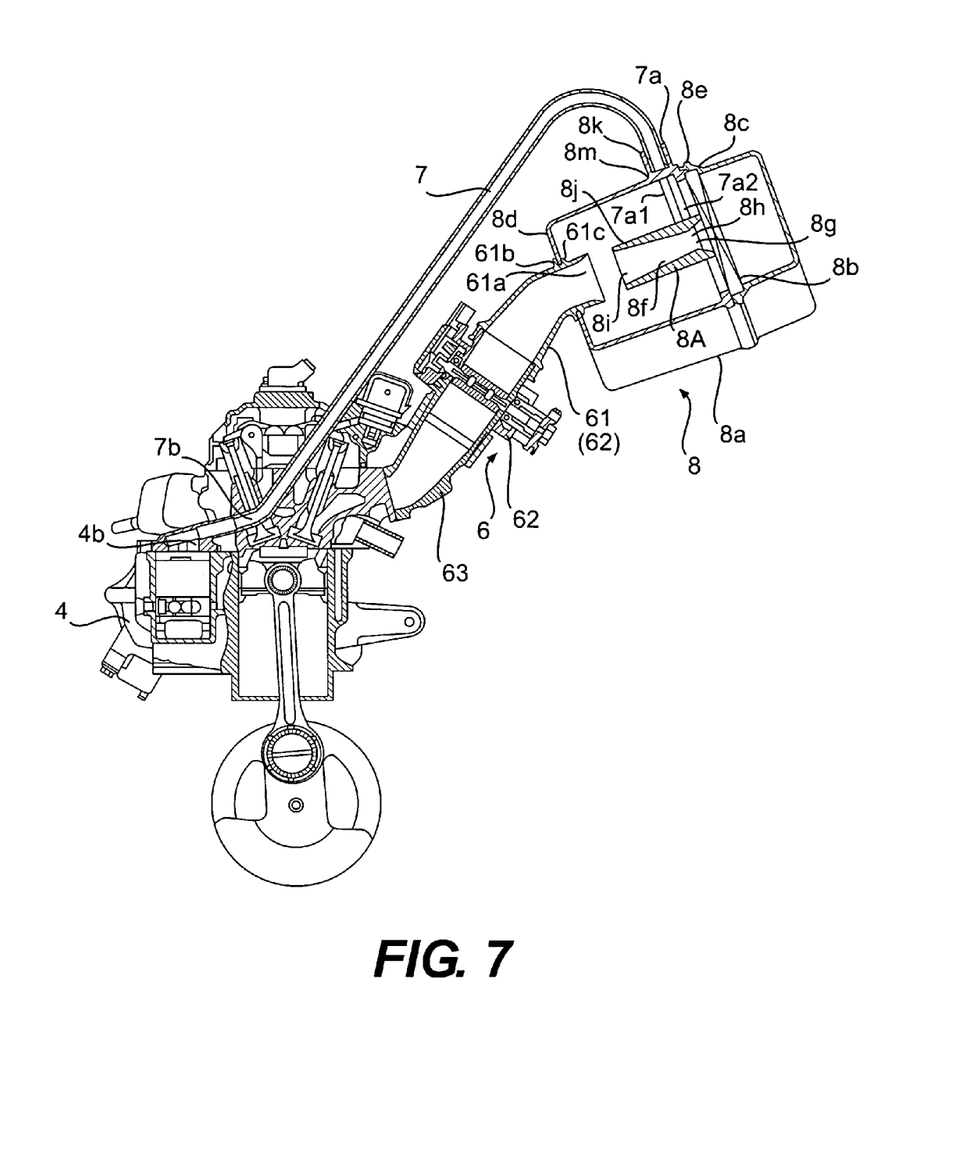
FIG. 7 is a drawing showing a second embodiment, for which FIG. 7 corresponds to FIG. 2(a)

FIG. 7 shows another embodiment of the present invention (hereinafter referred to as the second embodiment), and the second embodiment is characterized by a structure in which the venturi member 8A is disposed in the air cleaner 8 which has a substantially cylindrical outline. Although the second embodiment is different from the above-described embodiment in the structures of the air cleaner 8 and of the venturi member 8A to be arranged therein, other structures are not substantially different therefrom, and hence description of the common structures are omitted. The same reference numerals are used for the same structures.

The air cleaner 8 in the second embodiment is mounted to the pipe end portion 6a of the air-intake pipe 6 by fitting the opening edge 8d on the case wall on the downstream side of the case 8a in the annular groove 61c of the annular protruding portion 61b provided on the outer periphery of the connecting pipe 61 near the end thereof in such a manner that the pipe end of the air-intake pipe 6, that is, part of the upstream end 61a of the above-described first connecting tube 61 is taken into the interior of the case 8a.

The filter element 8b for removing foreign particles or dust is mounted in the cleaner case 8a, and the filter element 8b is mounted inside the case 8a with the annular peripheral portion 8c fitted and fixed to an annular groove 8e on the inner periphery of the cylindrical case 8a. The venturi tube 8A is disposed substantially at the center in the case 8a, and the venturi tube 8A includes a cylindrical member of a predetermined length. The hole defined by the inner periphery thereof corresponds to a flow path 8f of air, and the flow path 8f includes an opening 8g on the upstream side increased in diameter into a tapered shape, a squeezed portion 8h continued from the opening 8g and reduced in diameter, and an opening 8i on the downstream side which is opened via a flow path gradually increased in diameter again from the squeezed portion 8h into a tapered shape, and an outer peripheral portion 8j has substantially the constant outer diameter.

The venturi tube 8A is disposed with the flow path 8f oriented in the longitudinal direction of the cylinder of the cleaner case 8a, and the end of the opening 8g of the flow path on the upstream side is brought into abutment with and fixed to the side surface of the filter element 8b on the downstream side, whereby the venturi tube 8A is mounted substantially at the center of the cleaner case 8a. Then, in this mounting position, the centerline of the flow path 8f of the venturi tube 8A is positioned on the same line as the centerline of the air-intake pipe 6, and the end of the opening 8i of the flow path of the venturi tube 8A on the downstream side is positioned so as to oppose to the upstream end 61 of insertion in the case 8a of the air-intake pipe 6 with a predetermined clearance interposed therebetween.

An opening 8m provided with a projection 8k is formed on the cylindrical outer peripheral portion 8 of the cleaner case 8a, and the end 7a of the inlet channel (air-intake pipe) 7 on the side of the air-inlet port is inserted into the opening 8m. An extending portion 7a1 of the end 7a of the inlet channel 7 is extended in the cleaner case 8a toward the center portion thereof, and a distal end portion 7a2 defines a passage opening which extends from the outer periphery of the squeezed portion 8h of the venturi tube 8A to the inner periphery of the squeezed portion 8h. The other end 7b of the inlet channel 7 is connected to the inlet port 4b of the air compressor 4.

In this second embodiment, since the venturi tube (member) 8A is formed in the cleaner case 8a on the downstream side of the filter element 8b and the end 7a of the inlet channel 7 on the side of the inlet port is connected to the venturi tube 8A in addition to the aforementioned effects based on the commonality in structure with the first embodiment, the noise of the air-intake pulsation generated from the inlet port of the inlet channel 7 can be reduced by the cleaner case 8a.

Figure 8:
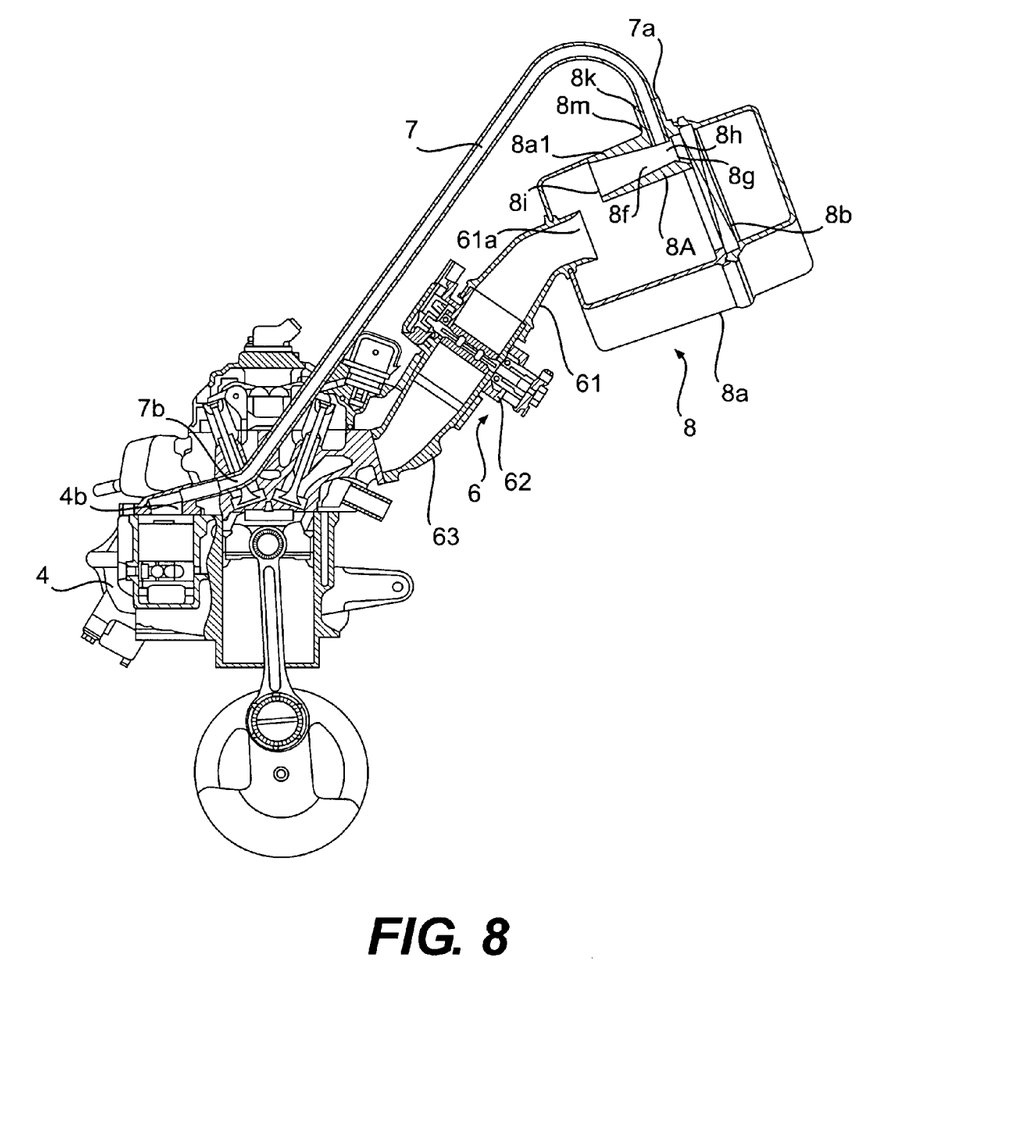
FIG. 8 is a drawing showing a third embodiment, for which FIG. 7 corresponds to FIG. 2(a).

FIG. 8 shows still another embodiment (hereinafter, referred to as a third embodiment). The third embodiment is characterized by the mounting position of the venturi tube (member) 8A in the cleaner case 8a and the mounting structure thereof. In this embodiment, the venturi tube 8A is formed on the inner periphery of the cylindrical cleaner case 8a directly as a part of the case 8a, and a part of the inner periphery of the case 8a corresponds to a boss-shaped thick portion 8a1, and the flow path 8f provided with a squeezed portion 8h of the venturi tube 8A directed in the longitudinal direction of the cylinder of the case 8a is formed on the boss-shaped thick portion 8a1.

The end of the opening 8g of the venturi tube 8A on the upstream side comes into abutment with the side surface of the filter element 8b on the downstream side, and the end of the opening 8i on the downstream side is opposed to the upstream end of the air-intake pipe 6 inserted into the cleaner case 8a, that is, to the upstream end 61a of insertion of the first connecting pipe 61 with the centerlines of the tubular paths significantly shifted from each other. The opening 8m provided with the cylindrical projection 8k is provided on the outer periphery of the cylindrical cleaner case 8a corresponding to the portion where the squeezed portion 8h of the venturi tube 8A is formed, and the opening 8m opens from the outer periphery of the case 8a to the squeezed portion 8h of the venturi tube 8A. Then, the end 7a of the inlet channel (air-intake pipe) 7 on the side of the air-inlet port is inserted into the opening 8m of the outer periphery of the case 8a, and the other end 7b of the inlet channel 7 is connected to the inlet port 4b of the air compressor 4.

In this third embodiment, the venturi tube (member) 8A is formed in the cleaner case 8a on the downstream side of the filter element 8b as in the second embodiment and the end 7a of the inlet channel 7 on the side of the air-inlet port is connected to the venturi tube 8A, in addition to the aforementioned effects based on the commonality in structure with the first embodiment. Therefore, the noise of the air-intake pulsation generated from the inlet port of the inlet channel 7 can be reduced by the cleaner case 8a. In addition, the venturi tube 8A is integrally formed with the cleaner case 8a, the work for mounting the venturi tube 8A is not necessary, and hence the number of components can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine with air-fuel mixture injection, comprising:
  an air-fuel mixture injection valve device for injecting a mixture of fuel and air to an internal combustion engine, and
  a compressor driven by a power from a crankshaft for supplying compressed air to the injection valve device,
  wherein one end of the compressor on a side of an air-inlet port is connected to an air-intake pipe in the internal combustion engine,
  wherein the air-intake pipe includes a plurality of connecting pipes, and
  wherein a downstream side of a first connecting pipe of the plurality of pipes is provided with a venturi member inside thereof.

2. The internal combustion engine with air-fuel mixture injection according to claim 1, wherein one end on the air-inlet port of the compressor is connected to the air-intake pipe via a case of the air cleaner at a position upstream of a throttle valve.

3. The internal combustion engine with air-fuel mixture injection according to claim 2,
wherein the venturi member is formed in the case on the downstream side of a filter element thereof, and an inlet channel, and the air-inlet ports and the venturi member are connected by the inlet channel.

4. The internal combustion engine with air-fuel mixture injection according to claim 1, wherein the injection valve device is constituted of a fuel injection valve for injecting liquid fuel and an air-fuel mixture injection valve having a head portion connected to an injection port of the fuel injection valve.

5. The internal combustion engine with air-fuel mixture injection according to claim 4, the fuel injection valve and the air-fuel injection valve are connected to each other in series, and penetrate through substantially a center of a cylinder head and a cylinder head cover of the internal combustion engine.

6. The internal combustion engine with air-fuel mixture injection according to claim 1, further comprising an air introduction portion of the injection valve device, the air introduction portion being connected to a high-pressure air discharge port of the compressor, and high pressure air from the air compressor is introduced into the air introduction portion at a connecting portion between the fuel injection valve and the air-fuel mixture injection valve.

7. The internal combustion engine with air-fuel mixture injection according to claim 1,
wherein the venturi member is formed into a substantially oval shape.

8. The internal combustion engine with air-fuel mixture injection according to claim 3, wherein the venturi member is disposed substantially at the center in the case.

9. The internal combustion engine with air-fuel mixture injection according to claim 3,
wherein the venturi member is formed on an inner periphery of the case directly as a part of the case,
a part of an inner periphery of the case corresponding to a boss-shaped thick portion of the venturi member, and
a flow path venturi member being formed on the boss-shaped thick portion of the venturi member, the flow path having a squeezed portion directed in an axial direction of the case.

10. The internal combustion engine with air-fuel mixture injection according to claim 1, wherein the compressor is provided in a cylinder block of the internal combustion engine, and
wherein the compressor is provided with a discharge port for supplying compressed high-pressure air to the fuel injection device through an air supply channel formed in a cylinder head of the internal combustion engine.

11. An internal combustion engine with air-fuel mixture injection, comprising:
an air-fuel mixture injection valve device for injecting a mixture of liquid fuel and air to an internal combustion engine, and
a compressor driven by a power from a crankshaft for supplying compressed air to an air supply port of the injection valve device,
wherein one end of the compressor on a side of an air-inlet port is connected to an air-intake pipe in the internal combustion engine,
wherein the air supply port of the of the injection valve device is connected to the injection valve device at a position downstream of where the liquid fuel is injected,
wherein the air-intake pipe includes a plurality of connecting pipes, and
wherein a downstream side of a first connecting pipe of the plurality of pipes is provided with a venturi member inside thereof.

12. The internal combustion engine with air-fuel mixture injection according to claim 11, wherein one end on the air-inlet port of the compressor is connected to the air-intake pipe via a case of the air cleaner at a position upstream of a throttle valve.

13. The internal combustion engine with air-fuel mixture injection according to claim 12,
wherein the venturi member is formed in the case on the downstream side of a filter element thereof, and an inlet channel, and the air-inlet ports and the venturi member are connected by the inlet channel.

14. The internal combustion engine with air-fuel mixture injection according to claim 11, wherein the injection valve device is constituted of a fuel injection valve for injecting the liquid fuel and an air-fuel mixture injection valve having a head portion connected to an injection port of the fuel injection valve.

15. The internal combustion engine with air-fuel mixture injection according to claim 14, the fuel injection valve and the air-fuel injection valve are connected to each other in series, and penetrate through substantially a center of a cylinder head and a cylinder head cover of the internal combustion engine.

16. The internal combustion engine with air-fuel mixture injection according to claim 11, further comprising an air introduction portion of the injection valve device, the air introduction portion being connected to a high-pressure air discharge port of the compressor, and high pressure air from the air compressor is introduced into the air introduction portion at a connecting portion between the fuel injection valve and the air-fuel mixture injection valve.

17. The internal combustion engine with air-fuel mixture injection according to claim 11,
wherein the venturi member is formed into a substantially oval shape.

18. The internal combustion engine with air-fuel mixture injection according to claim 13, wherein the venturi member is disposed substantially at the center in the case.

19. The internal combustion engine with air-fuel mixture injection according to claim 13,
wherein the venturi member is formed on an inner periphery of the case directly as a part of the case,
a part of an inner periphery of the case corresponding to a boss-shaped thick portion of the venturi member, and
a flow path venturi member being formed on the boss-shaped thick portion of the venturi member, the flow path having a squeezed portion directed in an axial direction of the case.

20. The internal combustion engine with air-fuel mixture injection according to claim 11, wherein the compressor is provided in a cylinder block of the internal combustion engine, and
wherein the compressor is provided with a discharge port for supplying compressed high-pressure air to the fuel injection device through an air supply channel formed in a cylinder head of the internal combustion engine.

* * * * *